(12) United States Patent
Krieger

(10) Patent No.: US 7,712,555 B2
(45) Date of Patent: May 11, 2010

(54) STEERABLE SERIES TWO SPEED MOTOR CONFIGURATION

(75) Inventor: Daniel J. Krieger, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 188 days.

(21) Appl. No.: 11/757,558

(22) Filed: Jun. 4, 2007

(65) Prior Publication Data

US 2008/0296083 A1    Dec. 4, 2008

(51) Int. Cl.
*B62D 11/02* (2006.01)
*B62D 3/14* (2006.01)

(52) U.S. Cl. ............... 180/6.48; 180/6.3; 180/6.54; 180/9.38; 60/422; 60/424

(58) Field of Classification Search ........... 180/6.48, 180/6.3, 6.54, 9.38; 60/422, 424
See application file for complete search history.

(56) References Cited

U.S. PATENT DOCUMENTS

| 3,386,523 | A | | 6/1968 | Ruhl |
| 3,592,281 | A | | 7/1971 | Utter et al. |
| 3,627,070 | A | | 12/1971 | Colten |
| 3,795,107 | A | | 3/1974 | Ward |
| 3,795,109 | A | | 3/1974 | Bojas et al. |
| 3,800,535 | A | | 4/1974 | Ward et al. |
| 3,862,668 | A | | 1/1975 | Ward |
| 3,872,669 | A | | 3/1975 | Ward |
| 3,914,938 | A | | 10/1975 | Cornell et al. |
| 3,917,014 | A | | 11/1975 | Ward |
| 3,988,893 | A | | 11/1976 | Bojas et al. |
| 4,011,920 | A | | 3/1977 | Bianchetta et al. |
| 4,256,432 | A | * | 3/1981 | Sugiyama ........... 414/694 |
| 4,840,193 | A | * | 6/1989 | Schiel ............. 137/627.5 |
| 6,220,377 | B1 | * | 4/2001 | Lansberry .......... 180/9.36 |
| 6,230,829 | B1 | * | 5/2001 | Martin et al. ........ 180/6.3 |
| 6,523,636 | B2 | | 2/2003 | Chatterjea |
| 6,662,556 | B2 | | 12/2003 | Bares et al. |
| 7,237,630 | B2 | * | 7/2007 | Jones .............. 180/6.48 |

FOREIGN PATENT DOCUMENTS

| FR | 2193156 | 2/1974 | ............. 13/2 |
| JP | 50113686 | 9/1975 | ............. 11/16 |
| JP | 54133275 | 10/1979 | ............. 11/16 |
| JP | 61103002 | 5/1986 | ............. 11/16 |

OTHER PUBLICATIONS

International Search Report and Written Opinion from the International Searching Authority in foreign application PCT/2008/007039, filed Apr. 6, 2008.

* cited by examiner

*Primary Examiner*—Lesley Morris
*Assistant Examiner*—Marlon A Arce
(74) *Attorney, Agent, or Firm*—John D. Veldhuis-Kroeze; Westman, Champlin & Kelly, P.A.

(57) ABSTRACT

A hydraulic system includes first and second pumps, first and second motors, and three valves for selectively creating combined and basic hydraulic flow. The arrangement of valves permits combined flow to be provided to both motors in series to cause high speed operation of the motors, and permits combined flow to be provided to one motor and basic flow to the other motor. When applied to a vehicle, the arrangement provides a steerable high speed series arrangement of the vehicle's drive motors.

19 Claims, 8 Drawing Sheets

STEERABLE SERIES TWO SPEED MOTOR CONFIGURATION

BACKGROUND

The present invention relates to a steerable series two speed motor configuration in which two motors may be operated in series with both motors operating at high speed or with one motor operating at high speed and the other operating at low speed to provide, for example steering capabilities for a vehicle.

SUMMARY

In one embodiment, the invention provides a hydraulic system comprising a hydraulic fluid reservoir, and first and second hydraulic pumps drawing hydraulic fluid from the reservoir and providing a basic flow of hydraulic fluid to the hydraulic system. The hydraulic system also includes first and second pump lines; third and fourth pump lines. The hydraulic system also includes a first directional valve actuable to place a selected one of the first and second pump lines in communication with the first pump and the other of the first and second pump lines in communication with the reservoir; and a second directional valve actuable to place a selected one of the third and fourth pump lines in communication with the second pump and the other of the third and fourth pump lines in communication with the reservoir. The hydraulic system also includes first and second hydraulic motors; and first and second motor lines communicating with the first motor; and third and fourth motor lines communicating with the second motor. The hydraulic system further includes a first valve actuable between a first position in which the first valve places the third pump line in communication with the third motor line, and a second position in which the first valve places the third pump line in communication with the first motor line; a second valve actuable between a first position in which the second valve places the second pump line in communication with the second motor line, and a second position in which the second valve places the second pump line in communication with the fourth motor line; and a linking valve actuable between a first position in which the linking valve cuts off communication between the second and third motor lines, and second position in which the linking valve places the second and third motor lines in communication with each other. Actuation of all of the first valve, second valve, and linking valve into their first positions causes low speed, parallel operation of the first and second motors under the sole influence of the respective first and second pumps. Actuation of all of the first valve, second valve, and linking valve into their second positions causes high speed, series operation of the first and second motors under the influence of a combined flow of hydraulic fluid from the first and second pumps. Actuation of the linking valve and one of the first and second valves into their second positions and actuation of the other of the first and second valves into its first position causes the motors to operate in series with one motor receiving a combined flow of hydraulic fluid from both pumps and the other motor receiving the basic flow of hydraulic fluid.

In another embodiment, the invention provides a vehicle comprising: a prime mover; first and second hydraulic pumps driven under the influence of the prime mover, such that each of the first and second pumps creates a flow of hydraulic fluid at a basic flow rate; first and second hydraulic motors operating in response to the flow of hydraulic fluid from the first and second pumps; and first and second travel mechanisms driven in response to operation of the first and second motors, respectively. The vehicle further comprises a valve system for selectively placing the first and second motors in series and parallel relationship. The valve system selectively provides hydraulic fluid to the first and second motors at the basic flow rate and at a combined flow rate that is twice the basic flow rate. The valve system is configurable to selectively provide hydraulic fluid at the combined flow rate to both of the first and second motors to cause the motors to operate in series at high speed. The valve system is also configurable to provide hydraulic fluid to one of the first and second motors at the combined flow rate to cause that motor to operate at high speed, and to provide hydraulic fluid to the other of the first and second motors at the basic flow rate to cause that motor to operate at low speed, to effect steering of the vehicle while maintaining the first and second motors in series relationship.

In another embodiment, the invention provides a method for operating a vehicle having a prime mover, first and second hydraulic pumps, first and second hydraulic motors, and first and second travel mechanisms. The method comprises the steps of: driving the first and second pumps with the prime mover; creating a flow of hydraulic fluid from each of the first and second pumps at a basic flow rate; arranging first and second motors in series relationship; combining the flow of hydraulic fluid from the first and second pumps into a combined flow of hydraulic fluid at a combined flow rate that is higher than the basic flow rate; passing the combined flow through the first motor to cause the first motor to operate at high speed; passing hydraulic fluid through the second motor at the basic flow rate to cause the second motor to operate at low speed; driving operation of the first and second travel mechanisms in response to operation of the first and second motors; and causing the vehicle to move non-linearly in response to the first and second motors operating in series with the first motor operating at high speed and the second motor operating at low speed.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
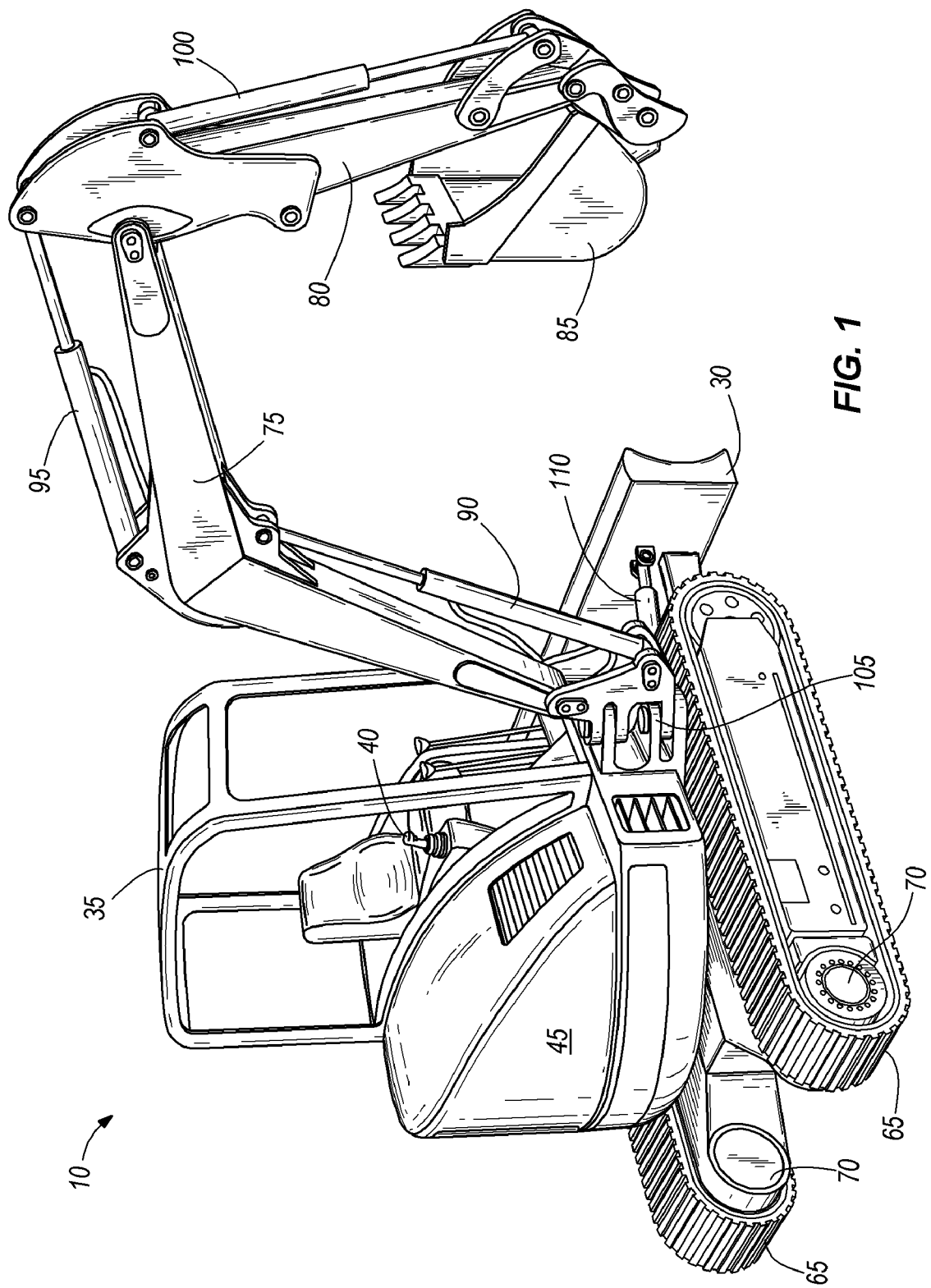
FIG. 1 is a perspective view of a vehicle including a hydraulic drive circuit embodying the present invention.
Figure 2:
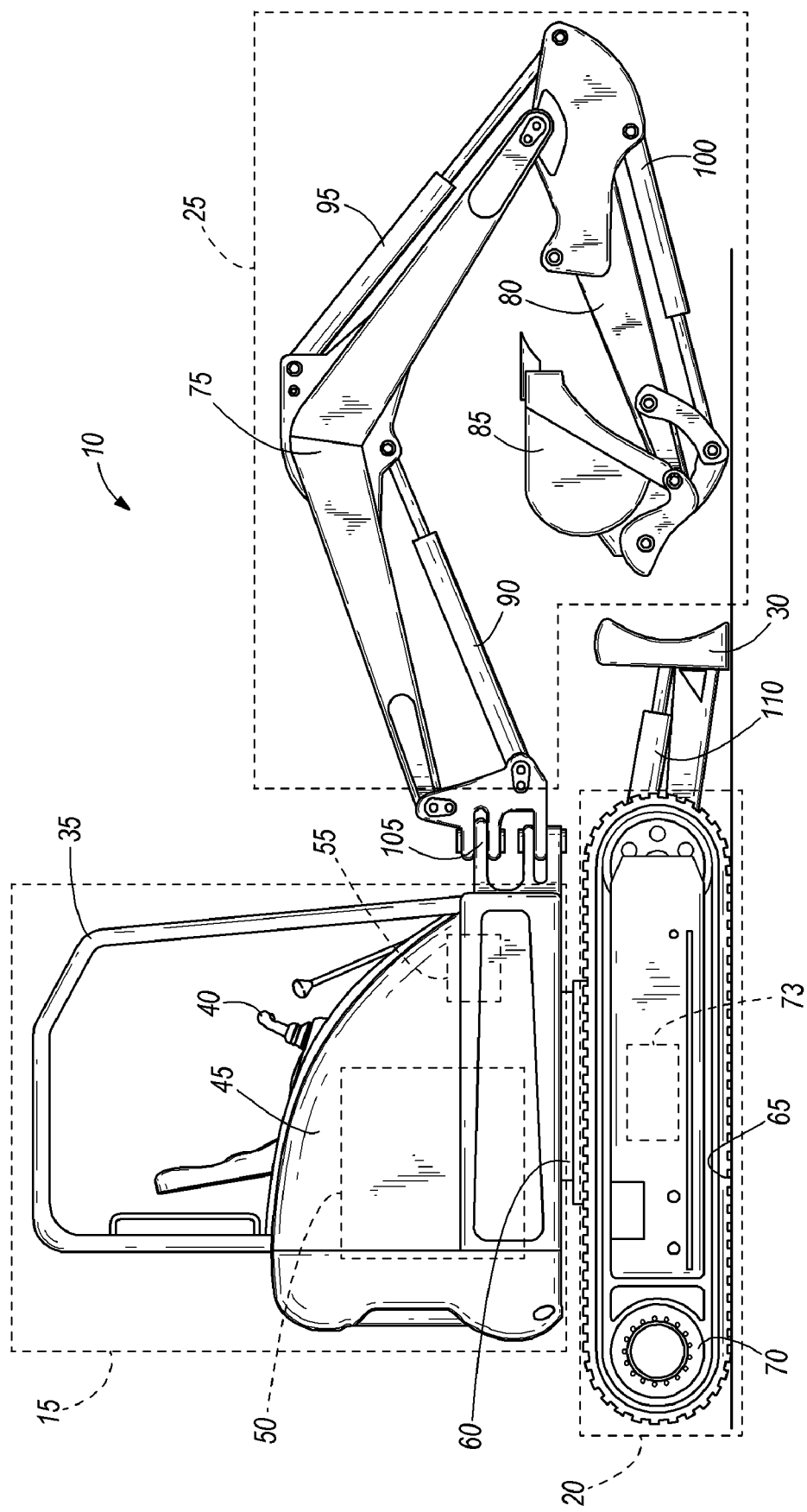
FIG. 2 is a side view of the vehicle

FIGS. 1 and 2 illustrate an excavator 10 that includes a house 15, an undercarriage 20, a workgroup 25, and a backfill blade 30. Although the invention is illustrated embodied in an excavator 10, the invention may be embodied in other vehicles and machines, including but not limited to compact track loaders, utility work vehicles, and skid steer loaders.

The house structure 15 includes an operator compartment 35 containing an operator control 40, an engine compartment or frame 45 containing an internal combustion engine 50, and a hydraulic system 55. The hydraulic system 55 operates in response to operation of the internal combustion engine 50. Although the illustrated embodiment includes an internal combustion engine 50, other embodiments may include other types of prime movers including but not limited to electric motors. Although the illustrated operator control 40 takes the form of a joystick, in other embodiments, the control may include multiple joysticks and/or foot pedals.

The house structure 15 is attached to the top of the undercarriage 20 via a swing bearing 60. The house 15 and workgroup 25 are able to rotate or "slew" about a vertical axis on the swing bearing 60 under the influence of a slew motor that operates under the influence of the hydraulic system 55. The operator control 40 is manipulated by an operator of the excavator 10 to selectively distribute the hydraulic fluid to the slew motor, the undercarriage 20, and/or the workgroup 25.

The undercarriage 20 includes rubber or steel tracks 65, drive sprockets 70, rollers, idlers, and portions of a hydraulic drive circuit 73 that is part of the overall hydraulic system 55. The drive circuit 73 rotates the drive sprockets 70. The tracks 65 rotate under the influence of the drive sprockets 70 and the excavator 10 navigates by rotating the right and left side tracks 65 forward and backward under the influence of the operator control 40. Although the vehicle 10 is illustrated as including tracks 65, in other embodiments the invention may be applied to vehicles having other travel mechanisms such as wheels, propellers or other means for engaging the ground or another surface to move the vehicle 10.

The workgroup 25 includes a boom 75, a dipper or arm 80, an attachment 85, a boom cylinder 90, a dipper cylinder 95, and an attachment cylinder 100. The illustrated attachment 85 is a bucket, but in other embodiments, the attachment may include an auger, a jackhammer, or other attachments suitable for the worksite. The workgroup 25 is attached to the front of the house structure 15 by way of a swing frame 105 that allows the workgroup 25 to be pivoted left or right to be offset with respect to the longitudinal extent of the undercarriage 20 for worksites that require digging and trenching parallel with the tracks 65. The hydraulic system 55 provides hydraulic fluid to the boom, dipper, and attachment cylinders 90, 95, 100 to pivot the boom 75 with respect to the house 15, the dipper 80 with respect to the boom 75, and the attachment 85 with respect to the dipper 80. The attachment 85 also receives hydraulic fluid from the hydraulic system 55 to actuate a moving part of the attachment with respect to other parts of the attachment 85 (e.g., moving parts of attachments such as augers, saws, rotary brushes, etc.).

A backfill blade cylinder 110 is pivotably interconnected between the backfill blade 30 and the undercarriage 20. The backfill blade cylinder 110 receives hydraulic fluid from the hydraulic system 55 and extends and retracts to raise and lower the backfill blade 30 with respect to the undercarriage 20. The backfill blade 30 is used for grading, leveling, backfilling, trenching, and general dozing work. The backfill blade 30 can be lowered against the ground to lift the rest of the excavator 10 and raise the dump height of the workgroup 25. The backfill blade 30 can also be used to stabilize the excavator 10 during digging operations.

Figure 3:
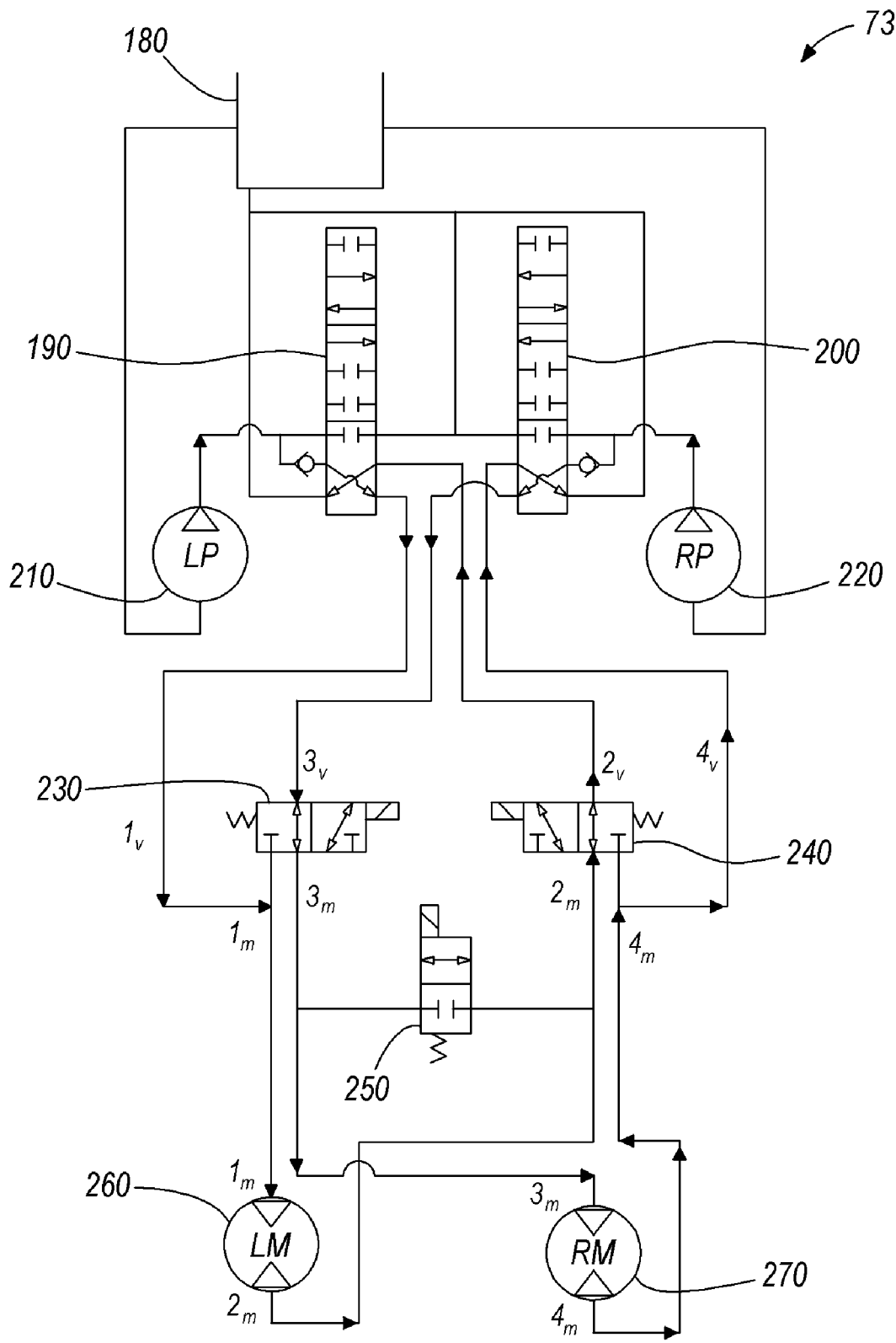
FIG. 3 is a schematic representation the hydraulic drive circuit in a low-speed forward drive configuration.

FIG. 3 schematically illustrates the hydraulic drive circuit 73 within the hydraulic system 55. The drive circuit 73 includes a reservoir 180 for hydraulic fluid. Left and right three position directional valves 190, 200 direct hydraulic fluid provided by respective left and right pumps 210, 220. The drive circuit 73 also includes left and right valves 230, 240, a linking valve 250, and left and right travel motors 260, 270. The left and right pumps 210, 220 are fixed displacement pumps in the illustrated embodiment, and are driven under the influence of the vehicle engine 50 to provide a flow of hydraulic fluid from the reservoir 180 through the drive circuit 73. The pumps 210, 220 in the illustrated embodiment have equal displacements, and both cause hydraulic fluid to flow at a basic rate. In some embodiments, only a portion of the drive circuit 73 is supported by the undercarriage 20. For example, the pumps 210, 220 and valves 190, 200, 230, 240, 250 may be supported by the frame 45, and the motors 260, 270 may be supported by the undercarriage 20.

The left and right valves 230, 240 are three-way two-position normally-open valves, and the linking valve 250 is a two-way two-position normally-closed valve. The left and right travel motors 260, 270 are fixed displacement bidirectional motors in the illustrated embodiment, and drive rotation of the left and right sprockets 70.

The three position directional valves 190, 200 include a central neutral position in which hydraulic fluid from the pumps 210, 220 flows back to the reservoir 180 without flowing through the motors 260, 270. When the directional valves 190, 200 are in the neutral position, the motors 260, 270 do not rotate and the vehicle 10 stands still. When the directional valves 190, 200 are shifted to a forward position (i.e., shifted up as seen in FIGS. 3-5 and 7), hydraulic fluid flows from the pumps 210, 220 into respective first and third pump lines 1v, 3v, which (as will be discussed below) results in forward rotation of the left and right motors 260, 270. Also, second and fourth pump lines 2v, 4v communicate through the directional valves 190, 200 with the reservoir 180 for return flow of hydraulic fluid. When the directional valves 190, 200 are shifted to a reverse position (i.e., shifted down as seen in FIGS. 6 and 8), hydraulic fluid flows from the pumps 210, 220 into the respective second and fourth pump lines 2v, 4v to cause reverse operation of the left and right motors 260, 270, and the first and third pump lines 1v, 3v are used as the return lines to the reservoir 180.

The at-rest condition of the linking valve 250 is closed, as illustrated in FIG. 3. When the linking valve 250 is closed, the left and right pumps 210, 220 drive the left and right motors 260, 270, respectively, in parallel. More specifically (using the example of FIG. 3, in which the directional valves 190, 200 are in the forward position), hydraulic fluid flows at the basic rate from the left pump 210 through the first pump line 1v, through a first motor line 1m, through the left motor 260, through a second motor line 2m, through the second pump line 2v, and back to the reservoir 180. In a similar fashion, hydraulic fluid flows at the basic rate from the right pump 220 through the third pump line 3v, through a third motor line 3m, through the right motor 270, through a fourth motor line 4m, through the fourth pump line 4v, and back to the reservoir 180. When operating in parallel, there is no combining of the flow from the first and second pumps 210, 220 until the fluid returns to the reservoir 180. In other words, when the linking valve 250 is closed, the hydraulic fluid flows through only one of the motors 260, 270 prior to returning to the reservoir 180.

The second and third pump lines 2v, 3v communicate with the respective right and left valves 240, 230, and the first and fourth pump lines 1v, 4v flow around the valves 230, 240. The configuration illustrated in FIG. 3 may be referred to as low-speed parallel mode because only hydraulic fluid from one of the pumps 210, 220 is supplied to each of the motors 260, 270, the hydraulic fluid is provided at the basic rate, and there is no mixing of the hydraulic fluid from the left and right loops.

If the directional valves 190, 200 are shifted down (i.e., into reverse), the drive circuit 73 operates in reverse mode, in which case all arrows are reversed in FIG. 3. When hydraulic fluid flows through the left motor 260 from the first motor line 1m to the second motor line 2m, and through the right motor 270 from the third motor line 3m to the fourth motor line 4m, the motors 260, 270 are said to rotate forward, which drives forward rotation of the vehicle's respective left and right sprockets 70. When hydraulic fluid flows through the left motor 260 from the second motor line 2m to the first motor line 1m, and through the right motor 270 from the fourth motor line 4m to the third motor line 3m, the motors 260, 270 are said to rotate in reverse, which drives reverse rotation of the left and right sprockets 70.

When the linking valve 250 is actuated, it places the second and third motor lines 2m, 3m in communication with each other, and thereby links the left and right side loops. When this is done in combination with actuating one or both of the left and right valves 230, 240, the hydraulic fluid from the left and right pumps 210, 220 is combined in at least a portion of the drive circuit 73 to form a flow of hydraulic fluid at a combined rate that is twice the basic rate. Hydraulic fluid flowing at the basic rate (i.e., "basic flow") is illustrated in the drawings with thin lines and hydraulic fluid flowing at the combined rate (i.e., "combined flow") is illustrated in the drawings with thick lines. The left and right motors 260, 270 rotate at a speed that is proportional to the volumetric flow of hydraulic fluid through them. Consequently, the motors 260, 270 operate at a "low speed" in response to basic flow, and at a "high speed" that is twice low speed in response to combined flow. Providing combined flow to both motors causes high-speed straight travel, and providing combined flow to one of the motors and basic flow to the other permits high-speed steering.

Figure 4:
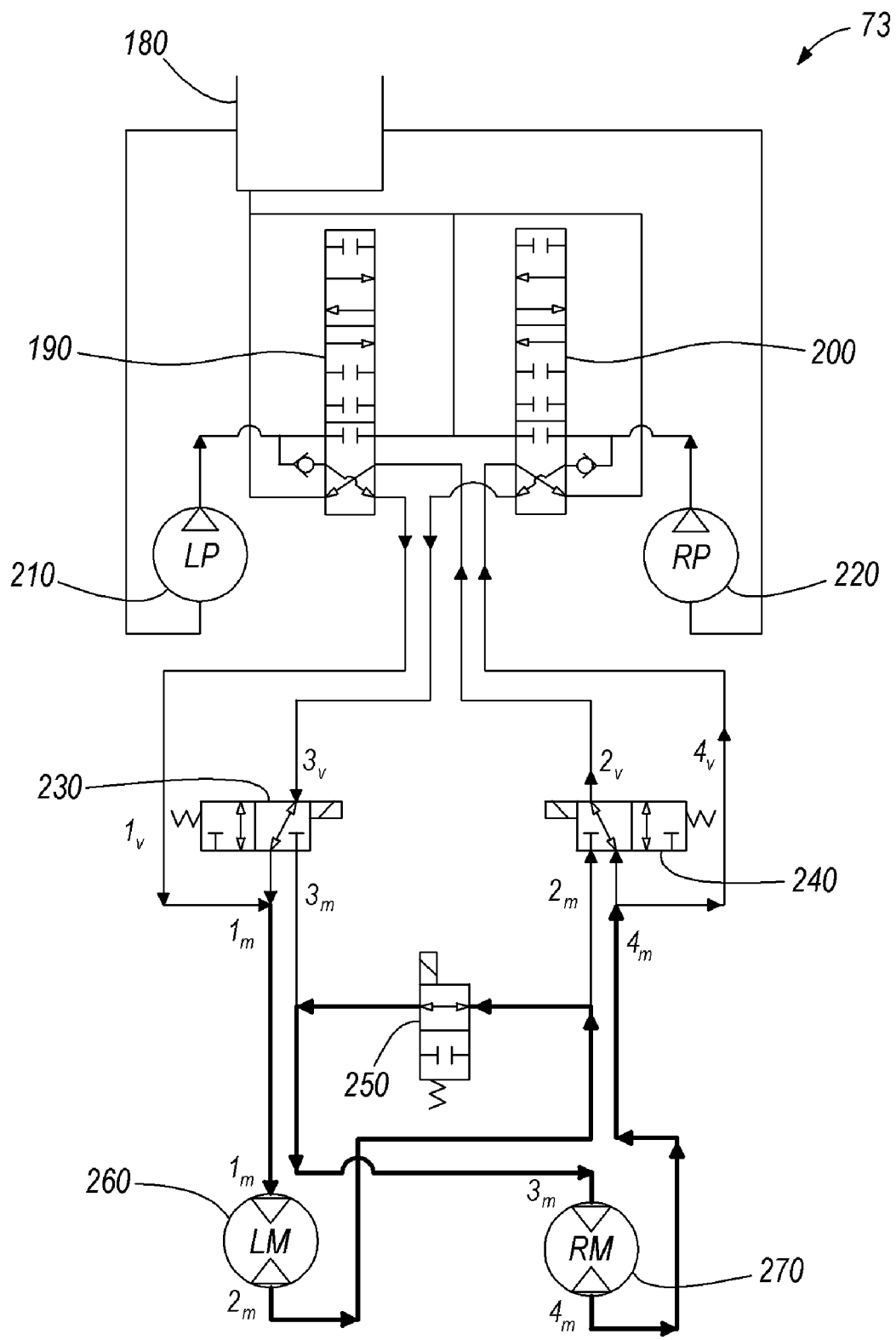
FIG. 4 is a schematic representation of the hydraulic drive circuit in a high-speed forward drive configuration.

In FIG. 4, all three valves 230, 240, 250 have been actuated and the left and right directional valves 190, 200 are in forward position. The left valve 230 merges the flow from the first and third pump lines 1v, 3v into the first motor line 1m, and the combined flow passes through the left motor 260 from the first motor line 1m into the second motor line 2m. The second motor line 2m is closed or dead-ended by the right valve 240, so the combined flow is directed from the second motor line 2m through the linking valve 250 and into the third motor line 3m. The combined flow passes through the right motor 270 from the third motor line 3m to the fourth motor line 4m. The combined flow is then split between the second and fourth pump lines 2v, 4v to return to the reservoir 180 at the basic rate. The left and right motors 260, 270 are connected in series because hydraulic fluid from the left motor 260 flows through the right motor 270 prior to returning to the reservoir 180. The motors 260, 270 rotate forward at high speed under the influence of the combined flow in this configuration. The motors 260, 270 would rotate in reverse at high speed if the valves 230, 240, 250 are left in the configuration seen in FIG. 3, but the directional valves are shifted into the reverse positions.

Figure 5:
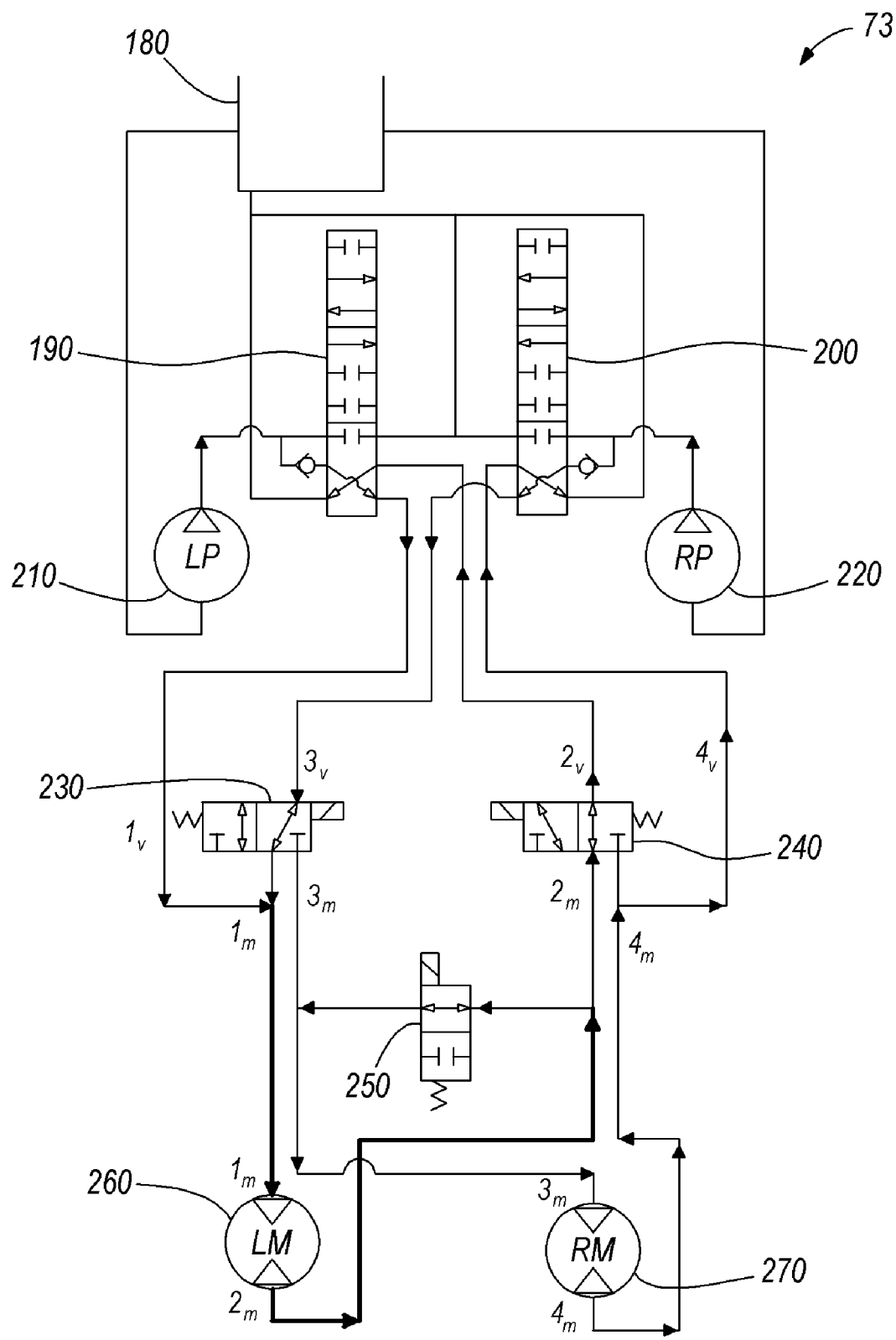
FIG. 5 is a schematic representation of the hydraulic drive circuit in a high-speed right turn forward drive configuration.
Figure 6:
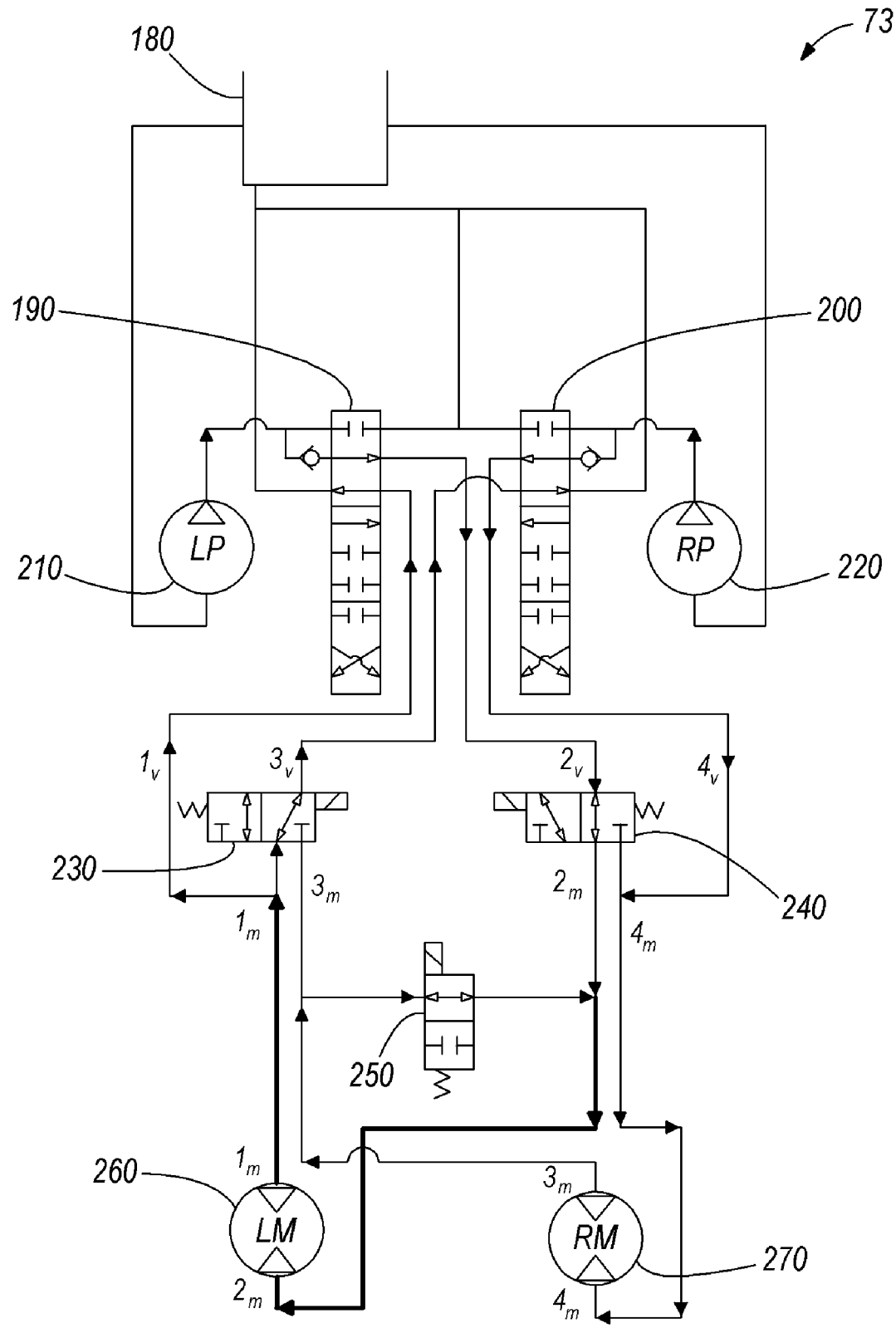
FIG. 6 is a schematic representation of the hydraulic drive circuit in a high-speed right turn reverse drive configuration.

In FIG. 5, the left valve 230 and the linking valve 250 are actuated, but the right valve 240 is in its at-rest position. Also, in FIG. 5, the left and right directional valves 190, 200 are in forward position. As with the configuration of FIG. 4, the flow from the left and right pumps 210, 220 is combined in the first motor line 1m, and therefore drives the left motor 260 forward at high speed. However, because the linking valve 250 is actuated but the right valve 240 is not, the second motor line 2m communicates with both the third motor line 3m (through the linking valve 250) and the second pump line 2v (through the right valve 240). The combined flow in the second motor line 2m therefore divides, with basic flow passing through the linking valve 250 and into the third motor line 3m, and basic flow flowing back to the reservoir 180 through the right valve 240 and second pump line 2v. The basic flow in the third motor line 3m passes through the right motor 270, into the fourth motor line 4m, and back to the reservoir 180 through the fourth pump line 4v. Consequently, the right motor 270 and right sprocket 70 are driven forward at low speed. As a result of this configuration, the vehicle's left sprocket 70 will rotate forward faster than the vehicle's right sprocket 70, and the vehicle 10 will move forward and turn right (i.e., following a non-linear path).

FIG. 6 illustrates vehicle operation when the valves 230, 240, 250 are configured as in FIG. 5, but the left and right directional valves 190, 200 are in reverse position (i.e., shifted all the way down). In this scenario, the right pump 220 provides hydraulic fluid through the fourth pump line 4v to the fourth motor line 4m, and the hydraulic fluid flows through the right motor 270 from the fourth motor line 4m to the third motor line 3m. The third motor line 3m is closed or dead-ended by the left valve 230 and communicates with the second motor line 2m through the linking valve 250. The left pump 210 provides hydraulic fluid through the second pump line 2v and the right valve 240 to the second motor line 2m, which results in combined flow in the second motor line 2m. The combined flow passes through the left motor 270 from the second motor line 2m to the first motor line 1m. The left valve 230 places first motor line 1m in communication with the third pump line 3v, and the combined flow is therefore split into two basic flows in the first and third pump lines 1v, 3v, which return to the reservoir 180. As a result, the vehicle's left sprocket 70 rotates in reverse faster than the vehicle's right sprocket 70, and the vehicle 10 will move in reverse and to the right.

Figure 7:
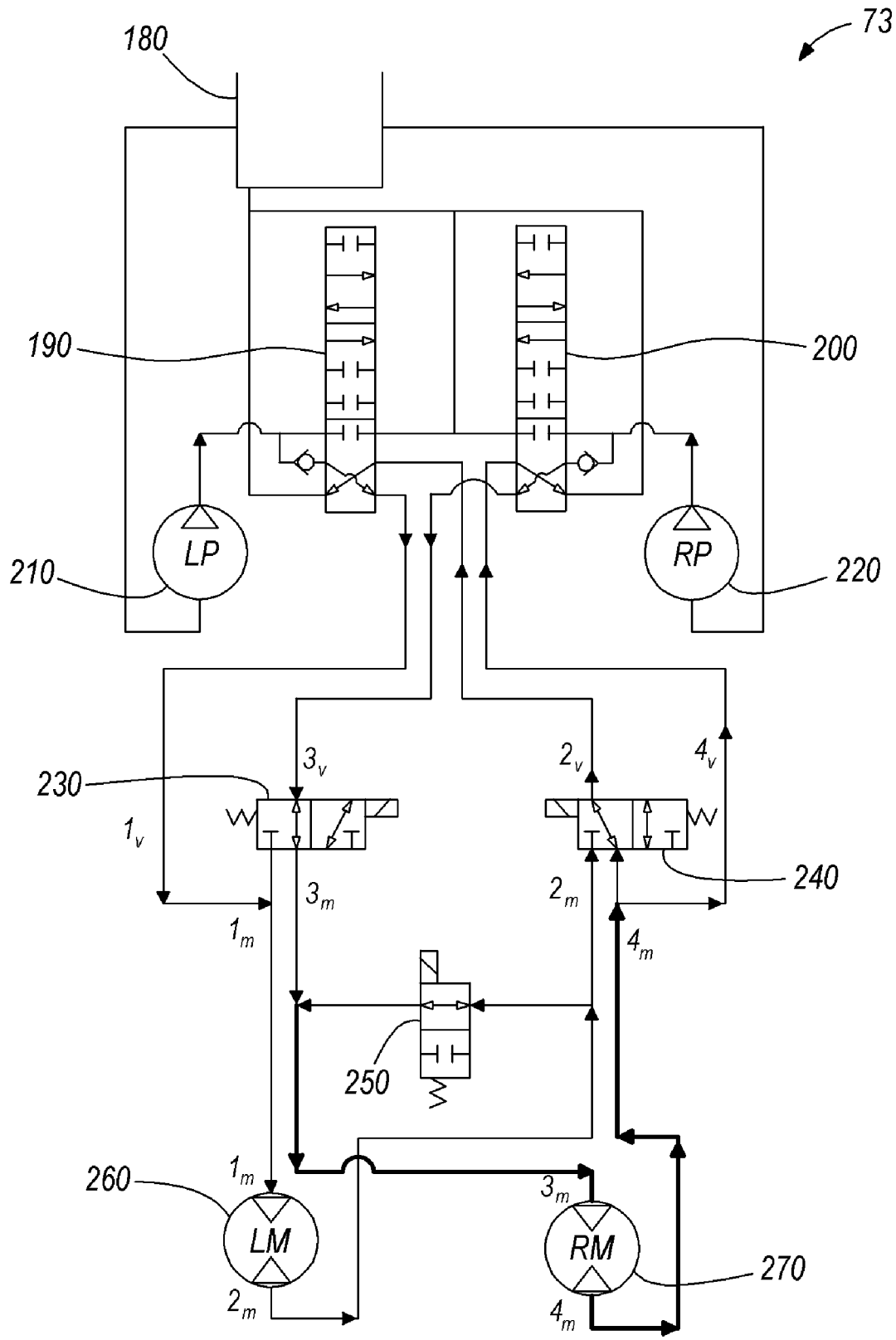
FIG. 7 is a schematic representation of the hydraulic drive circuit in a high-speed left turn forward drive configuration.
Figure 8:
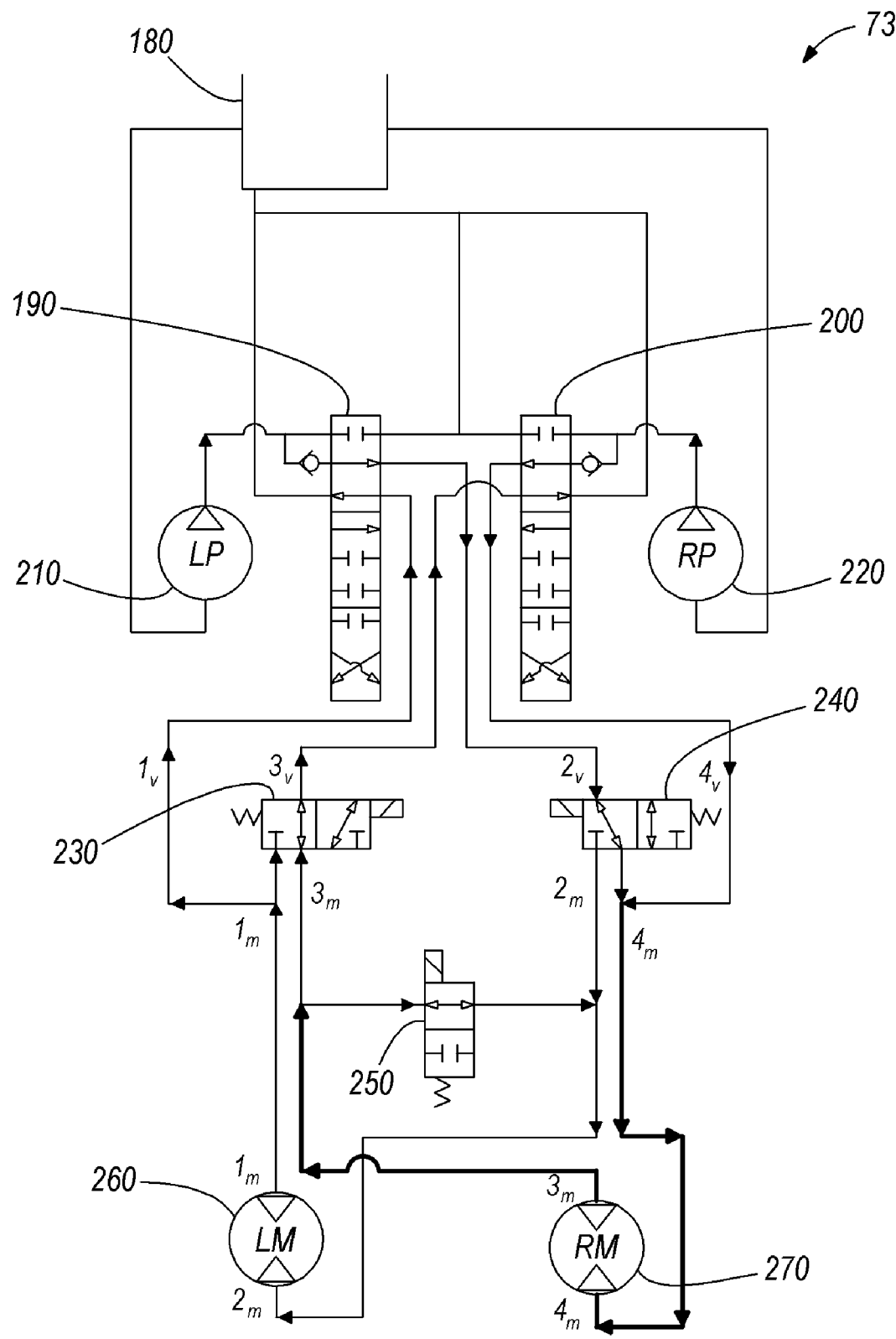
FIG. 8 is a schematic representation of the hydraulic drive circuit in a high-speed left turn reverse drive configuration.

FIG. 7 illustrates a configuration in which the right valve 240 and linking valve 250 are actuated, but the left valve 230 is in its at-rest position. Also in this configuration, the left and right directional valves 190, 200 are in forward position. The left pump 210 establishes basic flow supply of hydraulic fluid to the first motor line 1m through the first pump line 1v. The basic flow passes through the left motor 260 from the first motor line 1m to the second motor line 2m. The second motor line 2m is closed or dead-ended by the right valve 240, so the basic flow passes through the linking valve 250 and is merged into the third motor line 3m. The right pump 220 supplies basic flow to the third motor line 3m through the left valve 230 to create a combined flow in the third motor line 3m. The combined flow passes through the right motor 270 from the third motor line 3m to the fourth motor line 4m, and then splits between the second and fourth pump lines 2v, 4v for return to the reservoir 180 at the basic flow rate. This configuration causes high speed forward rotation of the right motor 270 and low speed forward rotation of the left motor 260 to cause the vehicle 10 to turn left.

FIG. 8 illustrates vehicle operation when the valves 230, 240, 250 are configured as in FIG. 7, but the left and right directional valves 190, 200 are in reverse position. The right valve 240 causes the basic flows from the left and right pumps 210, 220 in the second and fourth pump lines 2v, 4v to merge into a combined flow in the fourth motor line 4m. The combined flow passes through the right motor 270 from the fourth motor line 4m into the third motor line 3m. The left valve 230 places the third motor line 3m in communication with the third pump line 3v, and the linking valve 250 places the third motor line 3m in communication with the second motor line 2m. The combined flow splits, with basic flow passing through the left valve 230 and into the third pump line 3v for return to the reservoir 180, and basic flow passing through the linking valve 250 into the second motor line 2m. The basic flow in the second motor line 2m passes through the left motor 260, into the first motor line 1m, and back to the reservoir 180 through the first pump line 1v. As a result, the vehicle's right sprocket 70 rotates in reverse faster than the vehicle's left sprocket 70, and the vehicle 10 will move in reverse and to the left.

Thus, the invention provides, among other things, a system and method for selectively providing combined and basic flow to first and second motors arranged in series to permit steerable two speed series operation of the motors. Various features and advantages of the invention are set forth in the following claims.

What is claimed is:

1. A vehicle comprising:
a prime mover;
first and second hydraulic pumps driven under the influence of the prime mover, such that each of the first and second pumps creates a flow of hydraulic fluid at a basic flow rate;
first and second motors operating in response to the flow of hydraulic fluid from the first and second pumps;
first and second travel mechanisms driven in response to operation of the first and second motors, respectively; and
a valve system for selectively placing the first and second motors in series and parallel relationship, wherein in series relationship at least one of the first and second motors operates using combined flow of hydraulic fluid from the first and second pumps, and wherein in parallel relationship each of the first and second motors operates using flow of hydraulic fluid only from a respective one of the first and second pumps such that no combined flow of hydraulic fluid from both of the first and second pumps is provided to either of the first and second motors;
wherein the valve system selectively provides hydraulic fluid to the first and second motors at the basic flow rate and at a combined flow rate that is twice the basic flow rate;
wherein the valve system is configurable to selectively provide hydraulic fluid at the combined flow rate to both of the first and second motors to cause the motors to operate in series at high speed; and
wherein the valve system is also configurable to provide hydraulic fluid to one of the first and second motors at the combined flow rate to cause that motor to operate at high speed, and to provide hydraulic fluid to the other of the first and second motors at the basic flow rate to cause that motor to operate at low speed, to effect steering of the vehicle while maintaining the first and second motors in series relationship.

2. The vehicle of claim 1, wherein the valve system includes first and second valves selectively combining and separating the flow of hydraulic fluid to and from the first and second pumps, and a linking valve separate from the first and second valves for selectively placing the motors in series and parallel relationship.

3. A method for operating a vehicle having a prime mover, first and second hydraulic pumps, first and second hydraulic motors, and first and second travel mechanisms, the method comprising the steps of:
(a) driving the first and second pumps with the prime mover;
(b) creating a flow of hydraulic fluid from each of the first and second pumps at a basic flow rate;
(c) arranging first and second motors in series relationship, wherein in series relationship at least one of the first and second motors operates using combined flow of hydraulic fluid from the first and second pumps;
(d) combining the flow of hydraulic fluid from the first and second pumps into a combined flow of hydraulic fluid at a combined flow rate that is higher than the basic flow rate;
(e) passing the combined flow through the first motor to cause the first motor to operate at high speed;
(f) passing hydraulic fluid through the second motor at the basic flow rate to cause the second motor to operate at low speed;
(g) driving operation of the first and second travel mechanisms in response to operation of the first and second motors; and
(h) causing the vehicle to move non-linearly in response to the first and second motors operating in series with the first motor using the combined flow and thereby operating at high speed and with the combined flow not passing through the second motor such that the second motor operates at low speed.

4. The vehicle of claim 2, wherein the first and second hydraulic pumps are fixed displacement pumps having substantially equal displacements.

5. The vehicle of claim 4, wherein the first and second motors are fixed displacement bidirectional motors.

6. The vehicle of claim 5, wherein the first and second travel mechanisms are first and second tracks.

7. The vehicle of claim 2, and further comprising:
a hydraulic fluid reservoir;
first and second directional valves coupled to the first and second pumps and configured to direct hydraulic fluid provided by the first and second pumps.

8. The vehicle of claim 7, wherein the first and second directional valves are three position directional valves.

9. The vehicle of claim 8, wherein the first and second directional valves are configured such that in a neutral position in which hydraulic fluid from the first and second pumps flows back to the reservoir without flowing through the first and second motors such that the vehicle stands still.

10. The vehicle of claim 9, wherein the first and second directional valves, the first and second valves of the valve system and the linking valve of the valve system are configured such that when the first and second directional valves are shifted to a forward position, hydraulic fluid flowing from the first and second pumps travels in a manner which results in forward rotation of the first and second motors.

11. The vehicle of claim 10, wherein the first and second directional valves, the first and second valves of the valve system and the linking valve of the valve system are configured such that when the first and second directional valves are shifted to a reverse position, hydraulic fluid flowing from the first and second pumps travels in a manner which results in reverse operation of the first and second motors.

12. The vehicle of claim 11, wherein the first and second valves of the valve system are three-way two-position valves and the linking valve of the valve system is a two-way two-position valve.

13. A vehicle comprising:
a prime mover;
first and second hydraulic pumps driven under the influence of the prime mover, such that each of the first and second pumps creates a flow of hydraulic fluid at a basic flow rate;
first and second motors operating in response to the flow of hydraulic fluid from the first and second pumps;
a hydraulic fluid reservoir;
first and second three position directional valves coupled to the first and second pumps and configured to direct hydraulic fluid provided by the first and second pumps, wherein the first and second directional valves are configured such that in a neutral position of the first and second directional valves hydraulic fluid from the first and second pumps flows back to the reservoir without flowing through the first and second motors such that the vehicle stands still;
first and second travel mechanisms driven in response to operation of the first and second motors, respectively;
a valve system for selectively placing the first and second motors in series and parallel relationship, wherein the valve system includes first and second valves selectively combining and separating the flow of hydraulic fluid to and from the first and second pumps, and a linking valve separate from the first and second valves for selectively placing the motors in series and parallel relationship;
wherein the valve system selectively provides hydraulic fluid to the first and second motors at the basic flow rate and at a combined flow rate that is twice the basic flow rate;
wherein the valve system is configurable to selectively provide hydraulic fluid at the combined flow rate to both of the first and second motors to cause the motors to operate in series at high speed; and
wherein the valve system is also configurable to provide hydraulic fluid to one of the first and second motors at the combined flow rate to cause that motor to operate at high speed, and to provide hydraulic fluid to the other of the first and second motors at the basic flow rate to cause that motor to operate at low speed, to effect steering of the vehicle while maintaining the first and second motors in series relationship.

14. The vehicle of claim 13, wherein the first and second directional valves, the first and second valves of the valve system and the linking valve of the valve system are configured such that when the first and second directional valves are shifted to a forward position, hydraulic fluid flowing from the first and second pumps travels in a manner which results in forward rotation of the first and second motors.

15. The vehicle of claim 14, wherein the first and second directional valves, the first and second valves of the valve system and the linking valve of the valve system are configured such that when the first and second directional valves are shifted to a reverse position, hydraulic fluid flowing from the first and second pumps travels in a manner which results in reverse operation of the first and second motors.

16. The vehicle of claim 15, wherein the first and second valves of the valve system are three-way two-position valves and the linking valve of the valve system is a two-way two-position valve.

17. The vehicle of claim 13, wherein the first and second hydraulic pumps are fixed displacement pumps having substantially equal displacements.

18. The vehicle of claim 17, wherein the first and second motors are fixed displacement bidirectional motors.

19. The vehicle of claim 18, wherein the first and second travel mechanisms are first and second tracks.

* * * * *